(12) United States Patent  (10) Patent No.: US 6,399,006 B1
Stoick et al.  (45) Date of Patent: Jun. 4, 2002

(54) PROCESS AND APPARATUS FOR MOLDING POLYMER SWEEP FITTINGS

(75) Inventors: Michael Stoick, Prior Lake; Wayne A. Asp, St. Bonifacious, both of MN (US)

(73) Assignee: Entegris, Inc., Chaska, MN (US)

( * ) Notice: Subject to any disclaimer, the term of this patent is extended or adjusted under 35 U.S.C. 154(b) by 172 days.

(21) Appl. No.: 09/590,618

(22) Filed: Jun. 8, 2000

(51) Int. Cl.⁷ .......................... B29C 33/48; B29C 45/44
(52) U.S. Cl. .................... 264/328.1; 264/334; 425/556; 425/577; 425/DIG. 58; 249/64; 249/145
(58) Field of Search ............................. 264/318, 328.1, 264/334; 425/409, 438, 556, 577, DIG. 5, DIG. 58; 249/64, 145, 184

(56) References Cited

U.S. PATENT DOCUMENTS

| | | |
|---|---|---|
| 25,572 A | 9/1859 | Lowe |
| 143,327 A * | 9/1873 | Butler .................. 164/340 |
| 333,755 A | 1/1886 | Isaacs |
| 334,033 A | 1/1886 | Murdock |
| 380,030 A | 3/1888 | Greene |
| 389,019 A | 9/1888 | Smeaton |
| 431,609 A * | 7/1890 | Muckenhirn ............ 164/345 |
| 658,088 A | 9/1900 | Jones |
| 938,024 A | 10/1909 | Sigler |
| 1,347,575 A | 7/1920 | Bungay |
| 1,516,667 A * | 11/1924 | Bungay ................ 249/107 |
| 3,095,613 A | 7/1963 | Christensen et al. |
| 3,222,727 A | 12/1965 | Ford et al. |
| 3,545,718 A * | 12/1970 | Shale .................. 249/184 |
| 3,632,277 A | 1/1972 | Stalter |
| 3,677,688 A | 7/1972 | Morgan |
| 3,856,256 A | 12/1974 | Celesti |
| 4,476,913 A * | 10/1984 | Leuner et al. ........... 164/346 |
| 4,541,605 A | 9/1985 | Kubota et al. |
| 4,929,293 A | 5/1990 | Osgar |
| 5,385,705 A * | 1/1995 | Malloy et al. ........... 164/137 |
| 5,470,522 A | 11/1995 | Thome et al. |
| 6,082,992 A * | 7/2000 | Mitteregger et al. ...... 425/442 |

* cited by examiner

Primary Examiner—Jill L. Heitbrink
(74) Attorney, Agent, or Firm—Patterson, Thuente, Skaar & Christensen P.A.

(57) ABSTRACT

A method and apparatus for producing molded fluoropolymer sweep elbows with straight threadable ends that minimizes distortion of the fitting. The apparatus comprises a mold core or insert that is comprised of multiple curved segments which are retracted from the mold individually. The mold core is divided into two or more pieces on a curved plane parallel to the curved central axis of the core and the segments thus formed are retracted from the mold by a combination of arcuate and translational motions to avoid distortion of the fitting ends.

15 Claims, 3 Drawing Sheets

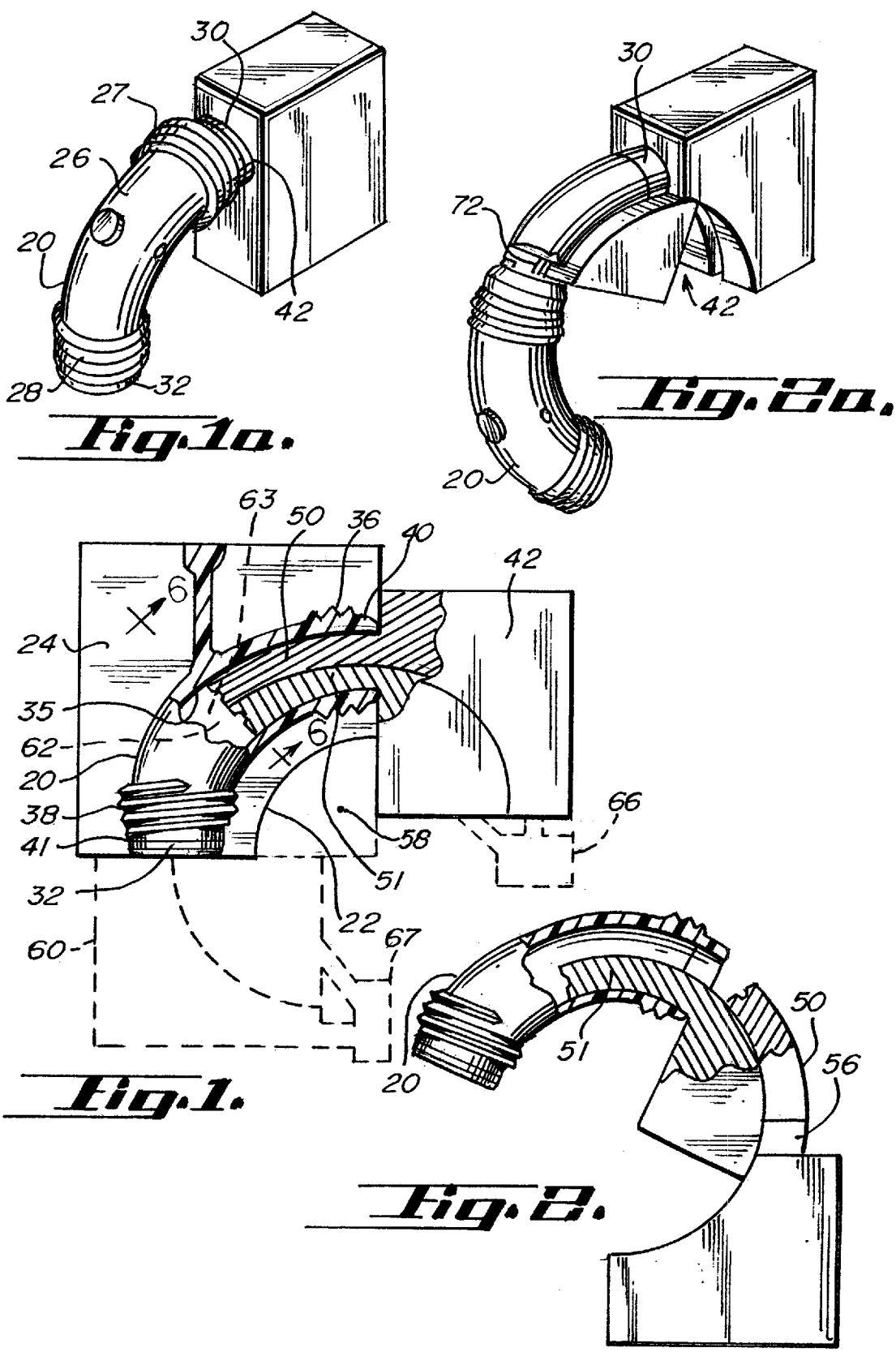

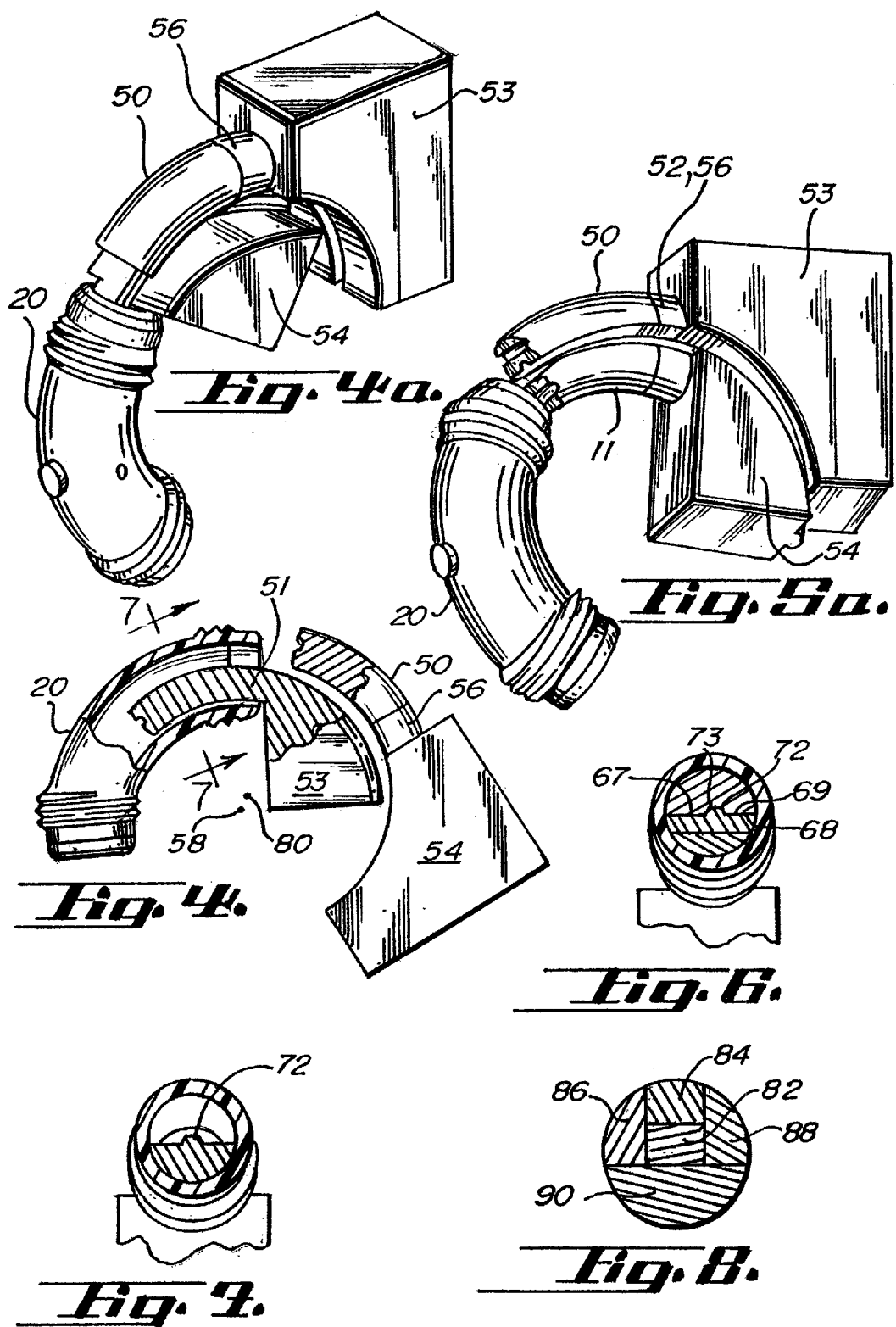

PROCESS AND APPARATUS FOR MOLDING POLYMER SWEEP FITTINGS

FIELD OF THE INVENTION

The invention relates to the field of molding fluid flow components. More particularly, it relates to molding a fluoropolymer sweep elbow with straight threadable ends while minimizing distortion of the fitting.

BACKGROUND OF THE INVENTION

In semiconductor manufacturing facilities, commonly known as fabs, highly corrosive ultrapure fluids are utilized in the manufacturing operations. Conventional plastics and metallic tubing and plumbing components are highly unsuitable in these applications. The materials of choice for plumbing components are fluoropolymer plastics such as PFA and PVDF because of their chemical inertness and nonwettability. The plumbing components will typically comprise tubing, valves, fittings, filters, sensors, tanks and the like.

It is absolutely critical that the connections between plumbing components have an extremely high level of integrity and strength. Typically, the pressure rating of plumbing used in such applications is 75 psi. Loss of joint integrity while carrying highly corrosive fluids at such pressures can result in serious bodily injury, destruction of property and environmental hazards.

The fluids that are handled may comprise slurries with suspended abrasive materials utilized for polishing semiconductor wafers. Such polishing must be carefully controlled and uniform over the surface of the wafer. It is desirable for plumbing that handles such slurries to have transitions that are as smooth as possible to minimize the formation of eddies or quiescent zones in which the suspended material may fall out of suspension. This avoids creating the possibility of a non-uniform distribution of abrasive and consequent uneven polishing of wafers. Uneven polishing creates unusable wafers and loss of yield. Thus, sweep elbows, which have a large turning radius relative to tubing diameter, are preferred to change the direction of fluid flow smoothly to keep suspensions uniform.

From a performance standpoint sweep elbows are preferable to conventional elbows, which may have a turning radius approximately equal to the tubing diameter. However, due to difficulties in molding fluoropolymer fittings such a sweep elbow has not been available. The fluid passageway in molded fittings is typically formed by a core which retracts out of the mold after injecting plastic into the cavity. Applicant is aware of no one that makes a fluoropolymer molded sweep elbow with flared connector ends. This is primarily due to the difficulty of maintaining the straightness and roundness of the nose portion of the fitting when the curved mold core is retracted from the molded part. Such distortion is unacceptable from a quality assurance standpoint since it can seriously reduce the integrity of any connection made with the nose. It is preferable that elbow ends are straight, that the elbow is not overly long and that it can be threaded on both ends. Current practice uses a one piece mold core or insert that distorts the elbow end as the insert is withdrawn from the part making straight ends impossible.

The conventional elongate nose of PFA flared fittings has been useful in that the extended surface area provides more circumferential sealing area and provides adequate structural support to resist bending moments at the fitting. These characteristics contribute to the integrity of the fitting seal under varying and hostile conditions.

An object of the invention then, is to manufacture a fluoropolymer sweep elbow that has straight elongate ends sufficient to provide adequate structural support and sealing surface area. An additional object is to minimize distortion of fittings that lowers quality and reduces yield of product. Another object of the invention is to provide sufficient straight length at the ends of the fitting to support threading to achieve a good threaded seal.

SUMMARY OF THE INVENTION

The present invention discloses a method and apparatus for producing molded fluoropolymer sweep elbows and other sweep fittings with straight threadable ends while minimizing distortion of the fitting. The apparatus comprises a mold core or insert that is comprised of multiple curved segments which are retracted from the mold individually. The mold core is divided into two or more pieces on a curved plane parallel to the curved central axis of the core and the segments thus formed are retracted from the mold by a combination of arcuate and translational motions to avoid distortion of the fitting ends.

The fluid passageway in molded fittings is typically formed by a core which retracts out of the mold after injecting liquid polymer into the cavity and allowing the plastic to at least partially set. In the present invention the core generally comprises an arcuate cylinder or segment of a toroid which has a greater and a lesser curvature. The core occupies the center of the mold to create the fluid passageway of the fitting. The core is divided into two or more pieces on a line parallel to the greater and lesser curvatures and between them. In the case of a two piece core each piece will generally have the shape of an arcuate hemicylinder. In this example a two piece core will be discussed. In some applications it may be desirable to divide the core into more segments. After the mold is filled, by injection, with liquid polymer and the polymer has at least partially set, the segment comprising the greater curvature of the core is retracted from the mold in an arcuate motion. After being completely retracted the greater segment is translated away from its center of rotation to provide clearance for the motion of the lesser segment. Subsequently, the lesser segment of the core is translated a small distance away from its center of rotation to free it from contact with the lesser curvature of the fluid passageway of the molded fitting. The lesser segment of the mold core is then retracted arcuately from the fluid passage of the fitting without the lesser segment further touching the molded item. Lastly, the female mold is opened to free the finished fitting.

A 90-degree sweep elbow is used as an example here. This should not be considered as limiting. It should be understood that the process and apparatus as described herein may be utilized to manufacture different types of fittings such as sweep elbows, sweep Ys, sweep Ts, sweep Us, traps and other fittings associated with valves, gauges, flow meters and other equipment and apparatus used in fab plumbing installations utilizing fluoropolymer materials.

BRIEF DESCRIPTION OF THE DRAWINGS

FIG. 1 depicts a molded component and the mold core in place in a mold in cross section.

FIG. 1a depicts a molded component and the mold core of FIG. 1 in perspective.

FIG. 2 depicts the molded component and the mold core with the greater segment of the mold core arcuately retracted in cross section.

FIG. 2a depicts the molded component and the mold core with the greater segment of the mold core arcuately retracted in perspective.

FIG. 4 depicts the molded component with the lesser segment of the mold core translated away from its center of rotation in cross section.

FIG. 4a depicts the molded component with the lesser segment of the mold core translated away from its center of rotation in perspective.

FIG. 5a depicts the mold core with both segments of the mold core arcuately retracted in perspective.

FIG. 6 depicts a view along line 6—6 of FIG. 4.

FIG. 7 depicts a view along line 7—7 of FIG. 4.

FIG. 8 is a cross-section view of a further embodiment of the invention.

DETAILED DESCRIPTION OF THE INVENTION

Figure 3A:
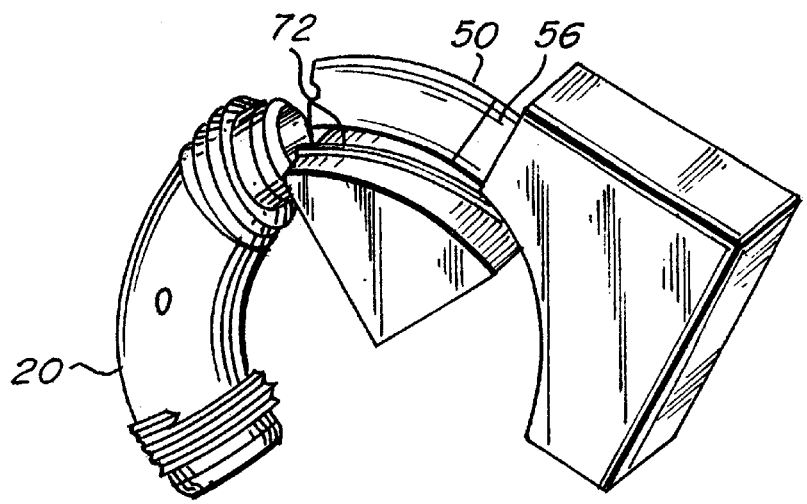
FIG. 3a depicts the molded component with the greater segment of the mold core translated away from its center of rotation in perspective.

FIG. 1 through FIG. 5 show the apparatus of the invention at various stages in the process. The component 20 in this example is a 90-degree sweep elbow though the invention may be practiced with a variety of other fittings that have a sweep curve as part of their structure. The component shown is formed by injection of molten fluoropolymer in the cavity 22 of a mold cavity block 24. The component 20 has a curved portion 26, a pair of exterior threaded portions 27, 28 and a pair of cylindrical nose portions 30, 32. The mold cavity has corresponding features: a curved section forming portion 35; thread forming portions 36,38 and straight cylindrical nose forming portions 40, 41.

FIG. 1 shows the component 20 with a segmented first mold core assembly 42 in place in the mold cavity block 24. The first mold core assembly 42 is divided into a first or greater segment 50 and a second or lesser segment 51 though more segments may be preferable in some applications. A second and additional mold cores may be utilized to form the remainder of the fluid passageway of the fitting as appropriate. In the case of a sweep elbow a generally similar mold core assembly 60 is used at the other end of the elbow. The similar second assembly has a third and fourth segments 62, 63 that retract and offset as described below for the first and second segments. Operating mechanisms 66, 67, shown in schematic form, control the motion of the core assemblies. Molten fluoropolymer is injected into the mold cavity and allowed to set, at least partially.

FIGS. 2 and 2a show the mold core assembly 42 after the greater segment 50 has been retracted from the mold. A straight section 56 of the core is a generally cylindrical portion of the core which forms the straight cylindrical inside surface of the nose portion of the fitting. This first retraction occurs arcuately about a center of rotation 58 while slidably maintaining contact with the lesser segment 51 of the mold core assembly 42 which remains in place for the time being. An alignment guide 71 may be utilized where the surfaces 67, 68 of the greater and lesser segments of the mold core meet at an interface 69 to maintain their relative alignment. See FIG. 6, this may take the form of an alignment boss 72 on one segment and a groove 73 on the other segment. Other alignment means may be used without departing from the spirit or scope of the invention.

Figure 3:
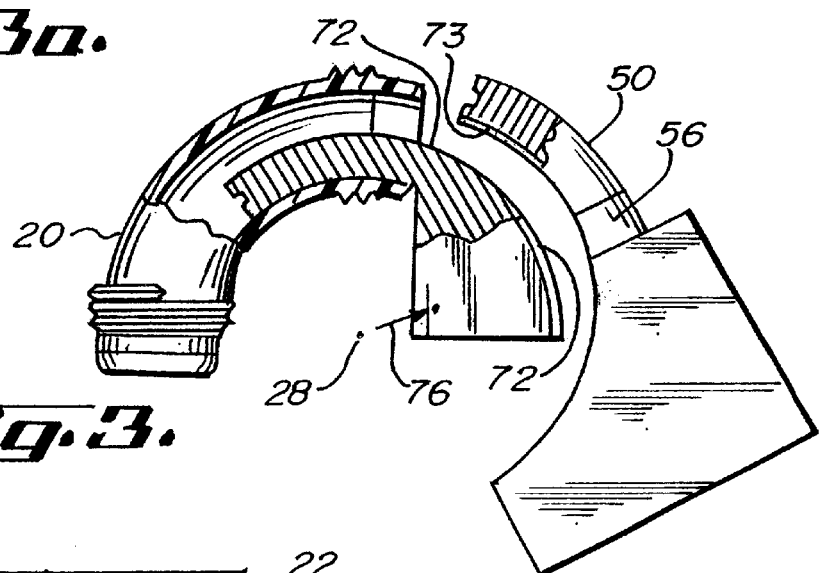
FIG. 3 depicts the molded component with the greater segment of the mold core translated away from its center of rotation in cross section.

FIGS. 3 and 3a depict the mold core assembly after the greater segment 50 has translated or offset away from its center of rotation as indicated by the arrow 76. This movement allows clearance for the subsequent motion of the lesser segment.

FIGS. 4 and 4a depict the lesser segment 51 of the mold core after a first radial offset before the axial arcuate retraction of said lesser segment. The offset is illustrated by the gap 79 in FIGS. 4 and 7 and by the displacement of the center of rotation 70 of the lesser segment from the center of rotation 58 of the greater segment. This creates clearance between the lesser segment of the mold core assembly 42 and the lesser curvature of the fluid passageway of the fitting 20. The lesser segment 51 of the mold core assembly 42 may then be arcuately retracted from the cavity of the mold without the segment touching or distorting the inside of the fitting 20, particularly the nose portion.

Figure 5:
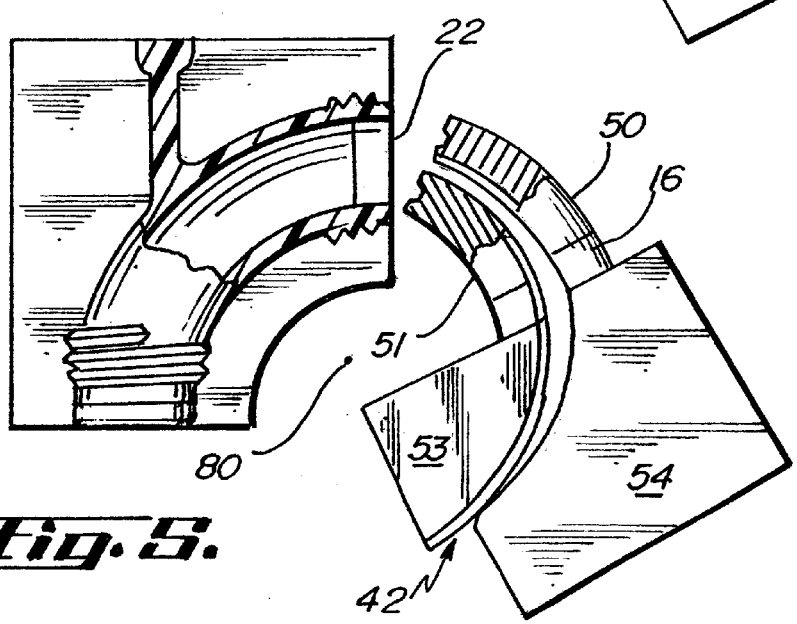
FIG. 5 depicts the molded component with the lesser segment of the mold core arcuately retracted in cross section.

FIGS. 5 and 5a depict the mold core assembly 42 after it has entirely retracted from the mold cavity 22. At this point in the process the third and fourth segments retract and offset in a fashion similar to the first and second segments. Further offsets or movements of the first or second mold core assemblies may be made to avoid interference with each other. The mold may then be opened to release the finished fitting.

Referring to FIG. 8, across sectional view of segments of an exemplary multiple segmented mold core assembly is illustrated. In this configuration, after the molded curved component has set, the central segment 82 would first be axially retracted out of the component. The upper segment 84 would then be offset radially downward to the region where the central component was and axially retracted. The two outer segments 86, 88 are then offset inward and retracted, either simultaneously or sequentially. The lower segment inward and then axially retracted.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

What is claimed is:

1. A method of forming a sweep elbow fitting having a straight cylindrical, a curved section, and a second straight cylindrical nose section, the method comprising the steps of:

inserting a segmented mold core, having a plurality of segments, including a first segment and a second segment each segment having an arcuate portion and a straight portion, into a mold cavity;

inserting a similar mold core, having a plurality of segments, including a third segment and a fourth segment each segment having an arcuate portion and a straight portion, into the mold cavity;

injecting a molten polymer into the mold cavity;

allowing the molten polymer to at least partially set;

arcuately retracting the first segment of the mold core from the mold cavity about a center of rotation;

translating the first segment away from the center of rotation;

offsetting the second segment from its molding position;

arcuately retracting the second segment;

arcuately retracting the third segment of the mold core from the mold cavity about a center of rotation;

translating the third segment away from the center of rotation;

offsetting the fourth segment from its molding position;

and arcuately retracting the fourth segment.

2. The method of claim 1, further comprising the step of selecting the segmented mold core and the similar mold core such that each have only two segments.

3. The method of claim 1, further comprising the step of selecting segments such that the first and second segments and the third and fourth segments share opposed surfaces and further comprise alignment guides on the opposed surfaces.

4. The method of claim 1, further comprising the step of injecting perfluoroalkoxy as the molten polymer.

5. A method of forming a curved fluid passageway in a plumbing fitting, the method comprising the steps of:

inserting a segmented mold core, having a first segment and a second segment each segment having an arcuate portion and a straight portion, into a mold cavity, the first segment and the second segment having an axially extending interface, each segment comprising approximately half of an arcuate cylinder, the first segment comprising the greater curvature thereof, the second segment comprising the lesser curvature thereof;

injecting a fluid polymer into the mold cavity;

allowing the fluid polymer to at least partially set;

arcuately retracting the first segment of the mold core from the mold cavity about a center of rotation;

translating the first segment away from the center of rotation;

translating the second segment away from the center of rotation;

and arcuately retracting the second segment from the mold cavity.

6. The method of claim 5, further comprising the step of selecting the first segment to have the greater curvature of an arcuate hemicylinder.

7. The method of claim 5, in which the polymer injected is perfluoroalkoxy.

8. A method of forming a curved fluid passageway in a plumbing fitting, the method comprising the steps of:

inserting a segmented mold core, comprising generally an arcuate cylinder, having a first segment, comprising a greater curvature of the arcuate cylinder and a second segment, comprising a lesser curvature of the arcuate cylinder, each segment having an arcuate portion and a straight portion, into a mold cavity;

injecting molten perfluoroalkoxy polymer into the mold cavity, allowing the molten polymer to at least partially set;

arcuately retracting the first segment of the mold core from the mold cavity about a center of rotation;

translating the first segment away from the center of rotation;

translating the second segment away from the center of rotation;

and arcuately retracting the second segment from the mold cavity.

9. A mold core for forming a curved fluid passage in a fluid flow fitting, the mold core comprising;

two segments, each segment having an arcuate portion and a straight portion, each segment comprising approximately half of an arcuate cylinder, one segment comprising a greater curvature thereof, the other segment comprising a lesser curvature thereof, the segments being movable arcuately and translationally, and being capable of insertion into and retraction from a mold cavity.

10. The mold core of claim 9, comprising a first segment and a second segment, each segment comprising approximately half of an arcuate cylinder, the first segment comprising the greater curvature thereof, the second segment comprising the lesser curvature thereof.

11. The mold core of claim 9, each segment thereof having at least one face in slidable opposition to at least one face of at least one other segment, the faces having alignment guides to maintain the relative alignment thereof.

12. The mold core of claim 11, in which the alignment indices comprise a boss on a first face and a groove on a second face.

13. A mold core for forming a curved fluid passage in fluid flow fitting, the mold core comprising;

a segment of a toroid of less than 180 degrees axially abutting a cylinder, the segment divided into multiple axial subsegments, each subsegment being slidably axially adjacent to another segment and configured to be movable translationally and arcuately and being capable of insertion into and retraction from a mold cavity.

14. The mold core of claim 13, the subsegments further comprising alignment guides.

15. The mold core of claim 13, in which the alignment guides comprise a boss on a first face and a groove on a second face of the subsegments.

* * * * *